US007489809B2

(12) United States Patent
Rust

(10) Patent No.: US 7,489,809 B2
(45) Date of Patent: Feb. 10, 2009

(54) INTERACTIVE VIRTUAL ENDOSCOPY

(76) Inventor: Georg-Friedermann Rust, Blumenstrasse 18, Gauting (DE) 82131

( * ) Notice: Subject to any disclaimer, the term of this patent is extended or adjusted under 35 U.S.C. 154(b) by 463 days.

(21) Appl. No.: 10/530,354

(22) PCT Filed: Oct. 6, 2003

(86) PCT No.: PCT/EP03/11033

§ 371 (c)(1), (2), (4) Date: Sep. 27, 2005

(87) PCT Pub. No.: WO2004/034327

PCT Pub. Date: Apr. 22, 2004

(65) Prior Publication Data

US 2006/0126920 A1    Jun. 15, 2006

(30) Foreign Application Priority Data

Oct. 4, 2002    (DE) ............................... 102 46 355

(51) Int. Cl.
*G06K 9/00* (2006.01)

(52) U.S. Cl. ................. 382/128; 382/154; 382/131; 382/285; 382/294; 382/307; 600/183; 600/313; 600/331; 600/338; 600/534; 345/420; 345/424; 345/650

(58) Field of Classification Search ................ 382/154, 382/128, 131, 285, 293, 294, 307, 302; 345/421, 345/424, 650, 420; 600/183, 313, 331, 338, 600/343, 358, 425, 534, 562; 378/66
See application file for complete search history.

(56) References Cited

U.S. PATENT DOCUMENTS 5,891,030 A * 4/1999 Johnson et al. ............. 600/407

| 6,694,163 | B1 * | 2/2004  | Vining ................. 600/407 |
| 6,718,193 | B2 * | 4/2004  | Knoplioch et al. .......... 600/407 |
| 7,097,357 | B2 * | 8/2006  | Johnson et al. ............ 378/205 |
| 7,304,644 | B2 * | 12/2007 | Geiger ................. 345/424 |
| 7,346,209 | B2 * | 3/2008  | Gokturk et al. ............ 382/159 |

FOREIGN PATENT DOCUMENTS

EP    0981109 A    2/2000

OTHER PUBLICATIONS

The Curvature-vector pair and its application in displaying Ct colon data, 2002 SPIE, Zhang et al.*
Wide Games Limited: "Prisoner of War" Codemasters Hompage, 'Online! Jul. 2002, XP002286513, Retrieved from the internet: URL:www.codemasters.com/pow/english/images/shot15_bg.jpg.
Zhang, The Curvature-Vector Pair and its Application in Displaying CT Colon Data, Proc. SPIE, Feb. 2002, pp. 213-221, vol. 4683.
Ferrucci, Colon Cancer Screening with Virtual Colonoscopy: Promise, Polyps, Politics, Am. Jrnl. of Roengenology, Nov. 2001, pp. 975-988, vol. 177, No. 5.
Springer, et al., Virtual CT-Colonoscopy, Aktuelle Radiologie, Nov. 1997, pp. 301-304, vol. 7, No. 6.
Sorantin, New Advances for Imaging of Laryngotrachealstenosis by Post Processing of Spiral-CT Data, 'Online! 2000,XP002286516.

* cited by examiner

*Primary Examiner*—Samir A Ahmed
*Assistant Examiner*—Nancy Bitar
(74) *Attorney, Agent, or Firm*—IP Strategies

(57) ABSTRACT

The invention relates to a method for processing of a three-dimensional image data set, wherein the three-dimensional image data set is converted to a data set suitable for a two-dimensional image reproduction. The invention further relates to apparatuses for performing the required calculations and/or for reproduction of the data representations. The invention is particularly appropriate for medical applications of endoscopy, in particular, coloscopy.

10 Claims, 1 Drawing Sheet

INTERACTIVE VIRTUAL ENDOSCOPY

FIELD OF INVENTION

The invention relates to a method for processing a three-dimensional image data set, wherein the three-dimensional image data set is converted to a data set for two-dimensional image reproduction. The method is particularly appropriate for virtual endoscopy (e.g., coloscopy). The invention further relates to apparatuses for performing the required calculations and/or the reproduction of the data representations.

BACKGROUND OF THE INVENTION

In medical science, the endoscopy of a colon by means of an endoscope is referred to as coloscopy and the respective specifically designed endoscopes are known as coloscopes. A coloscope comprises an optical system usually connected with a display device to allow for diagnosis by a physician. Insertion of a coloscope in the colon is sensed as being intrusive or even painful by many patients and always, in particular, in the case of enteritis/colitis, includes a risk of penetrating the intestinal wall.

As an alternative virtual coloscopy has been developed during which no physical coloscope has to be inserted in the patient's body any longer. Instead of coloscopes methods and apparatuses used in computer tomography/magnetic resonance imaging are used to detect data and to visualize the data. Progress of virtual coloscopy has significantly been advanced by the fact that due to the increased computational power of present day computers expensive image processing can readily be carried out.

With virtual coloscopy, a large number of spatially resolved parallel slices is recorded by a tomographic means. Each of these slices corresponds to a set of two-dimensional image data. These data sets are numerically converted to a three-dimensional image data set. From this three-dimensional image, data set two-dimensional image data can be calculated again that are independent of the direction of the original slice (cut), e.g., oblique to this direction. Usually the two- and three-dimensional image data are reproduced by means of a two-dimensional display device (monitor, photo, etc.), namely they are visualized as sectional views (i.e. all of the displayed pixels belong to one intersection plane) or as pseudo-three-dimensional images that create a three-dimensional impression in a way similar to conventional photography (the pixels do not originate from a plane surface).

It should be noted that it could not be decided a priori which one of the views is most suitable for the most accurate diagnosis. Whereas the (pseudo)-three-dimensional data representations are rather demonstrative due to the spatial impression given and thus, are helpful for the spatial orientation, it is particularly for these views that possible anomalies as lesions are hidden by tissue (e.g. by a colon fold) and therefore are invisible. Contrarily, in sectional views such a concealing does not occur. However, the sectional views are not very helpful for a medical treatment that usually requires a three-dimensional coordination.

BRIEF SUMMARY OF THE INVENTION

In view of the above problems it is an object of the invention to provide methods and apparatuses that do not suffer from the mentioned drawbacks of virtual coloscopy.

This object is solved by the method according to claim 1, the computer program product according to claim 9 and the image processing and reproduction system having the features of claim 10. Advantageous embodiments are defined in the dependent claims.

Whereas the invention is made specifically for the needs of virtual coloscopy and whereas it is described with regard to this range of application, it is to be understood that the basic ideas of the invention can be applied to any three-dimensional data set. Potential further ranges of application in medical science include all kinds of virtual endoscopy, other tomographic methods, ultrasonic examination methods, X-ray examination methods with tracers, etc. Potential ranges of application outside medical science comprise atmospheric research (e.g., meteorology, climatology), seismology, exploration of natural resources (ore, coal, oil and gas resources), material testing, etc.

According to the inventive method a three-dimensional image data set is converted to at least two different data representations for image reproduction and a reproduction of the at least two different data representations is realized, wherein one image section that is shown in one of the data representations is markable and for the at least one other data representation the relative position of the marked image section is calculated and shown.

Thus, image data for (at least) one sectional view, which is more suitable for detection of anomalies, and image data for (at least) one three-dimensional view, which is more suitable for three-dimensional imagination, can be extracted from a three-dimensional data set obtained by virtual coloscopy, for example. Since a priori it can hardly be foreseen which one of the views is most indicative for diagnosis, employment of different views, in particular, multiple different sectional views and multiple different three-dimensional views, allow for a more reliable diagnosis.

If one of the view shows an anomaly the anomalous section in this data representation can be marked, e.g., by means of a mouse click, by means of a marking polygon or other marking methods. After the marking has been done it is automatically calculated where the marked section is located in the other data representation or where it is located relatively to the other data representation respectively.

If the section marked in the first data representation is also visually shown in the second data representation, this can be indicated, e.g., by a solid contour, a solid circle etc. around the respective image section in the second data representation. If on the other hand the section is hidden by tissue in the second data representation or if the section is located above or below the shown surface in case of sectional views, this may be indicated by, e.g., a dashed marking. This has the additional advantage that different physicians, e.g. physicians with different experiences, in particular, physicians from different fields (e.g. radiologists and gastroenterologists) whose standard working views are often different from each other can communicate more precisely with each other, since the risk of ambiguous diagnoses or interpretations is reduced. As a result this leads to an improved collaboration of the physicians and to an improved as well as less costly medical treatment.

If the marking exhibits a specified geometric form, it is advantageous that this form is deformed for further data representations corresponding to changed line of sights so that the viewer gains a perspective view.

The explanation given above for one further or one second data representation can be generalized for a plurality of further data representations. The different data representations may, e.g., be simultaneously reproduced with one single reproduction device (e.g., a monitor) with all the data representations being displayed with the same dimensions or with different sizes according to their significance.

The inventive method may be performed by exclusively employing either sectional views or three-dimensional views.

The advantages of the inventive method, however, are particularly emphasized, if at least one data representation is a sectional view and at least one data representation is a three-dimensional view, since these data representations are somewhat complementary to each other in terms of advantages and disadvantages.

Preferably, the at least one sectional view comprises an axial view and/or a frontal view and/or a sagittal view and/or an oblique view and the at least one three-dimensional view comprises a wall (mucous membrane) view and/or an intraluminal view. These views represent specific views commonly known by the skilled person that are described in more detail with reference to the accompanying FIGURE.

According to a preferred embodiment of the inventive method the at least two different data representations comprise a topogram view (as described in more detail with reference to the accompanying FIGURE) which offers an excellent overview of the section under examination and for which numerical methods for automatic visualization of the colon extension are available.

Thereby a position can be marked in the shown colon extension at which an anomaly is suspected or that is to be examined for different reasons. The respective marked section or its relative position can then be shown in the other data representation(s).

On the other hand, an anomaly found and marked in one other data representation may be indicated in the colon extension reproduced by the topogram and helpful information with respect to diagnosis/therapy are thereby provided.

If in one of the data representations an anomaly is found and marked, according to an advantageous embodiment, the other data representations can be changed in such a way that the image section shown in the one data representation is also shown in the other data representations. For example, the intersection planes for the (other) sectional views may be automatically selected such that they also visually show the marked anomaly, e.g., in such a manner that the anomaly occupies a maximum sectional area.

According to a preferred embodiment, the marking is done manually, e.g., by an input device as a computer mouse, a computer keyboard, a touchpad, etc. Alternatively or in addition, the marking of the shown image section can be done by means of automatic structure and/or texture recognizing methods that can identify anomalies in an image by particular characteristics of these anomalies.

An embodiment of the method according to which the three-dimensional image data set of a hose-shaped body is processed and at least one of the data representations is a wall view with a line of sight that is parallel and/or anti-parallel to the curvature vector at the maximum curvature of the mid-line of the hose-shaped body is advantageous for the examination of hose-shaped bodies as canals and other leads, blood vessels and, in particular, for endoscopy.

By calculating individual pixels that define a mid-line by calculating barycenters, such a mid-line can usually be defined for a hose-shaped body, even if the cross sections of the body differ from ideal circles.

The maximum curvature may be understood as the absolute maximum in the mathematical sense but usually it is taken as a local maximum in the mathematical sense (local maximum curvature) representing a position at which the curvature vector is smaller than in its closest proximity.

The above-described method is particularly helpful in examining hose-shaped bodies that do not extend straight along one spatial direction but rather are (possibly repeatedly) bent. The mid-line of such a body represents a curved line in space.

In the case of bent hose-shaped bodies, the method provides at least one of the following wall views: the wall view of the area of the inner surface of the hose-shaped body that is bent most in the longitudinal direction and/or the opposite wall view. For bent canals the shown wall views are, e.g., elongated or shortened walls sections at which the material is stressed most and that are therefore particularly vulnerable to defects. In the context of the colon or blood vessels such areas showing strong curvatures and even kinks are sections in which anomalies not only preferably occur but also are particularly difficult to detect.

The above described inventive method and the preferred embodiments are particularly suitable for virtual endoscopy, in particular, virtual coloscopy (but also in neighbored fields as virtual bonchioscopy, intestinoscopy, NHN-endoscopy, ventricle endoscopy). By the interactive interplay of the different data representations one can profit from complementary advantages of the different data representations and disadvantages that are specific for each of the data representations can be circumvented.

For example, the inventive method can also be applied to conventional coloscopy, since an ultrasound head at a conventional coloscope can also provide three-dimensional image data sets that are similar to the ones discussed above.

The object underlying the invention is further solved by computer program product to be read by or to be implemented in a computer respectively and that is adapted to perform the steps of (a) converting a three-dimensional image data set to at least two different data representations for image reproduction and (d) calculating the relative position of the marked image section in the at least one other data representation.

The computer program product converts the three-dimensional image data set to different data representations for a reproduction of the images derived from the three-dimensional image data set. A marking applied ex post to one of the data representations is processed so that a relative position of the marking in the other data representations is calculated and that the respective image data are modified in accordance with the calculated values so that the relative position of the marking can be shown in the other data representations.

The object is also solved by an image processing and reproducing system comprising at least one device, e.g., a monitor, for image reproduction of a three-dimensional image data set by at least two different data representations, a device, e.g., a computer mouse, for marking one image section that is shown in one of the data representations; a device for calculation of the relative position of the image section marked in the one data representation in the at least one other data representation.

Preferably, the above described computer program product is implemented in the device for calculation of the relative position of the image section marked in the one data representation in the at least one other data representation.

BRIEF DESCRIPTION OF THE DRAWING

In the following, the invention and the advantages of the invention will be described with respect to a preferred example and with reference to the accompanying FIGURE.

DETAILED DESCRIPTION OF THE INVENTION

Figure 1:
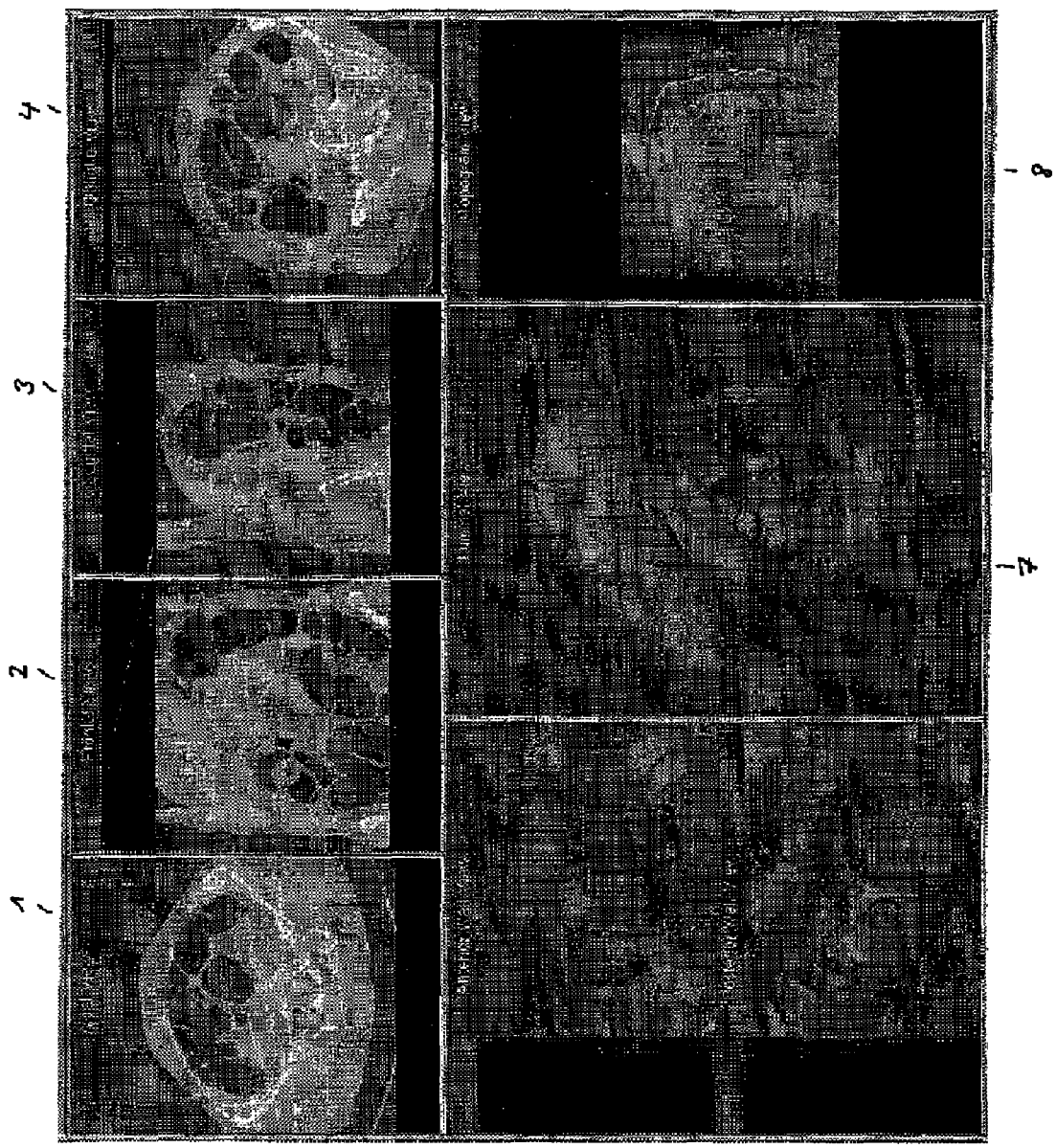
FIG. 1 shows most beneficial views of the virtual coloscopy altogether integrated in one user interface.

The upper row in FIG. 1 shows four two-dimensional views, namely from left to right:
- an axial view 1 corresponding to a cut perpendicular to the longitudinal axis of the body
- a frontal view 2,
- a sagittal view 3, and
- an oblique view 4.

The intersection planes of the three sectional views 1, 2 and 3 are orientated perpendicular to each other. Orientation of the oblique view 4 is arbitrary. It is useful to orientate the surface normal of the oblique view corresponding to an axis or the preferred orientation of the organ under examination.

The two-dimensional sectional view 4 is calculated from the generated three-dimensional data set that again was generated from a plurality of two-dimensional sets of detected data.

The data representations 5 to 8 do not represent sectional views but rather give a three-dimensional impression and thereby allow for an overview of the examined body region.

The data representations 4 and 5 are called wall views. The images result from virtually cutting the colon canal parallel to the longitudinal axis and by taking pictures by virtual cameras that are orientated perpendicular to the longitudinal axis. One can distinguish between an "anterior wall view" 5 and a "posterior wall view" 6 for an opposite and a back view of the intestinal wall, respectively.

Internists are familiar with views like 7 and 8 of FIG. 1. They allow the experienced internerst to gain a three-dimensional impression of the region that is to be examined or to be treated.

The intraluminal view 7 corresponds to an image of the inner colon canal obtained by conventional coloscopy with the difference that it is generated by means of a virtual coloscope.

The topogram view 8 that is also generated from a three-dimensional data set by the tomographic method corresponds to a common radiogram. The sinuous line seen in the FIGURE represents a virtual path within the colon that is generated automatically by a computer.

If, e.g., the physician recognizes an anomaly of the intestinal mucosa in one of the images, he is enabled to select the respective image section in the image by a mouse click and he subsequently is provided with the respective positions in all the other images, i.e. the sectional views (two-dimensional images) as well as the (quasi-)three-dimensional data representations.

In the (quasi-)three-dimensional data representations a marking appears, if the anomaly, e.g., a lesion, is visible for the virtual camera, and a dashed marking appears, if it is not visible for the virtual camera. Thus, the internist, who possibly has to carry out the treatment, learns behind which tissue (e.g., a colon fold) the anomaly is hidden. The views "intraluminal" and "topogram" are of particular importance, since they represent the kind of data representations internists are usually familiar with and they are by far most appropriate for three-dimensional orientation in terms of lucidity and clearness. Supplemented by a marking in the topogram they allow for an immediate localization of an anomaly by the internist.

The invention claimed is:

1. Method for processing of a three-dimensional image data set, wherein
   (a) The three-dimensional image data set is converted to at least two different data representations for image reproduction;
   (b) the at least two different data representations are reproduced;
   (c) one image section that is shown in one of the data representations is markable;
   (d) for the at least one other data representation the relative position of the marked image section is calculated;
   (e) the relative position of the marked image section is shown in the at least one other data representation;
   wherein the at least one data representation is a sectional view and the at least one other data representation is a three-dimensional view;
   wherein the at least one sectional view comprises an axial view and a frontal view and a sagittal view and an oblique view;
   wherein the at least one three-dimensional view comprises a wall view and an intraluminal view;
   wherein the three-dimensional image data set of a hose-shaped body is processed; and
   wherein the at least one of the data representations is a wall view with a line of sight that is parallel or anti-parallel to the curvature vector at the maximum curvature of the mid-line of the hose-shaped body.

2. Method of claim 1, wherein the at least one of the data representations is a topogram view.

3. Method according to claim 1, wherein the at least one other data representation is changed so that the image section marked in the one data representation is also shown in the at least one other data representation.

4. Method according to claim 3 wherein the shown image section is marked manually or by means of a structure or a texture recognizing method.

5. Method according to claim 1 for use in virtual endoscopy, in particular, virtual coloscopy.

6. A computer-readable medium storing a program having instructions that, when executed by a computer, cause the computer to perform the steps (a) and (d) of the method according to claim 1.

7. An image processing and reproducing system for performing a method according to claim 1, comprising
   at least one device for image reproduction of a three-dimensional image data set by at least two different data representations;
   a device for marking one image section that is shown in one of the data representations;
   a device for calculation of the relative position of the image section marked in the one data representation for the at least one other data representation.

8. An image processing and reproducing system according to claim 7 for performing a method according to claim 1, comprising
   at least one device for image reproduction of a three-dimensional image data set by at least two different data representations;
   a device for marking one image section that is shown in one of the data representations; and
   a device for calculation of the relative position of the image section marked in the one data representation for the at least one other data representation;
   including a computer readable medium embodied with a computer program that is adapted to perform the steps (a) and (d).

9. Method according to claim 2, wherein the three-dimensional image data set of a hose-shaped body is processed; and at least one of the data representations is a wall view with a line of sight that is parallel or anti-parallel to the curvature vector at the maximum curvature of the mid-line of the hose-shaped body.

10. Method according to claim 3, wherein the three-dimensional image data set of a hose-shaped body is processed; and at least one of the data representations is a wall view with a line of sight that is parallel or anti-parallel to the curvature vector at the maximum curvature of the mid-line of the hose-shaped body.

\* \* \* \* \*